(12) United States Patent
Allen (10) Patent No.: US 12,318,839 B2
(45) Date of Patent: Jun. 3, 2025

(54) AM CYLINDER MANUFACTURING METHOD USING SACRIFICIAL BUILD TUBE

(71) Applicant: GOODRICH CORPORATION, Charlotte, NC (US)

(72) Inventor: Jason Bradley Allen, Waco, TX (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 18/157,579

(22) Filed: Jan. 20, 2023

(65) Prior Publication Data

US 2023/0249254 A1  Aug. 10, 2023

Related U.S. Application Data (60) Provisional application No. 63/306,803, filed on Feb. 4, 2022.

(51) Int. Cl.
  *B22F 10/47* (2021.01)
  *B22F 10/25* (2021.01)
  (Continued)

(52) U.S. Cl.
  CPC .............. *B22F 10/47* (2021.01); *B22F 10/25* (2021.01); *B22F 10/30* (2021.01); *B22F 10/66* (2021.01);
  (Continued)

(58) Field of Classification Search
  CPC ...................................................... B22F 10/47
  See application file for complete search history.

(56) References Cited

U.S. PATENT DOCUMENTS

| | | | | |
|---|---|---|---|---|
| 4,798,930 A | * | 1/1989 | Geisseler ............... | B23K 9/046 219/76.12 |
| 5,622,216 A | * | 4/1997 | Brown ................... | B33Y 30/00 164/71.1 |

(Continued)

OTHER PUBLICATIONS

The International Bureau of WIPO, International Search Report and Written Opinion dated Apr. 12, 2023 in Application No. PCT/US2023/011292.

(Continued)

*Primary Examiner* — Christopher S Kessler
(74) *Attorney, Agent, or Firm* — SNELL & WILMER L.L.P.

(57) ABSTRACT

An additive manufacturing system and process for manufacturing aircraft parts is disclosed. The process applying an additive manufacturing process to a build tube formed around a longitudinal axial direction of the build tube by rotating the build tube around a longitudinal axis. Then, translating, by the additive manufacturing process, a print-head in a parallel configuration to the longitudinal axis to enable the print-head to deposit an aerospace grade material on a surface of the build tube to form a manufactured component. After completion of the additive manufacturing process, applying another process using a device wherein the device applies a machining process in the longitudinal axial direction to remove the build tube wherein the machining process comprising machining an interior surface of the manufactured component to expose the interior surface of the manufactured component.

12 Claims, 5 Drawing Sheets

(51) Int. Cl.
*B22F 10/30* (2021.01)
*B22F 10/66* (2021.01)
*B33Y 10/00* (2015.01)
*B33Y 40/20* (2020.01)
*B33Y 50/02* (2015.01)

(52) U.S. Cl.
CPC .............. B33Y 10/00 (2014.12); B33Y 40/20 (2020.01); B33Y 50/02 (2014.12); *B22F 2998/10* (2013.01)

(56) References Cited

U.S. PATENT DOCUMENTS

| | | | |
|---|---|---|---|
| 9,975,169 B2 | 5/2018 | Xu et al. | |
| 10,704,845 B2 | 7/2020 | Chipko et al. | |
| 2012/0165969 A1* | 6/2012 | Elsey | B29C 64/112 700/120 |
| 2015/0039113 A1 | 2/2015 | Kanada | |
| 2016/0297024 A1* | 10/2016 | Tan | B23K 9/048 |
| 2017/0173886 A1 | 6/2017 | Menchik et al. | |
| 2019/0126353 A1* | 5/2019 | Garry | B22F 10/47 |
| 2021/0029994 A1 | 2/2021 | Peterson | |
| 2021/0252780 A1 | 8/2021 | TenHouten et al. | |
| 2021/0254904 A1 | 8/2021 | Bhaskar et al. | |
| 2021/0263500 A1 | 8/2021 | Jacobs et al. | |

OTHER PUBLICATIONS

International Bureau, International Preliminary Report on Patentability dated Aug. 6, 2024 in PCT/US2023/011292.

* cited by examiner

AM CYLINDER MANUFACTURING METHOD USING SACRIFICIAL BUILD TUBE

CROSS-REFERENCE TO RELATED APPLICATIONS

This application claims benefit of priority to U.S. Provisional Application Ser. No. 63/306,803 entitled "AM CYLINDER MANUFACTURING METHOD USING SACRIFICIAL BUILD TUBE", filed on Feb. 4, 2022, the entire contents of which are incorporated by reference for all purposes.

FIELD

The present disclosure relates to systems and methods of forming aircraft components using additive manufacturing.

BACKGROUND

Additive manufacturing can significantly reduce the buy-to-fly ratio versus forgings for aircraft parts such as cantilevered landing gear cylinders. A build tube may be used during the additive manufacturing process since it serves as a base on which to deposit material. However, large build tubes comprised of aerospace materials such as titanium may not be readily available.

SUMMARY

A method for applying an additive manufacturing process is disclosed. The method includes applying an additive manufacturing process to a build tube around a longitudinal axial direction of the build tube by rotating the build tube around a longitudinal axis; translating, by the additive manufacturing process, a print-head in a parallel configuration to the longitudinal axis to enable the print-head to deposit an aerospace grade material on a surface of the build tube to form a manufactured component; after completion of the additive manufacturing process, applying, by a device, a machining process in the longitudinal axial direction to remove the build tube, wherein the machining process comprising machining an interior surface of the manufactured component to expose the interior surface of the manufactured component.

In various embodiments, the manufactured component comprises a manufactured cylinder.

In various embodiments, the build tube comprises non-cylindrical workpiece.

In various embodiments, the build tube is used as a sacrificial component and removed by the machining process applied to the interior surface of the manufactured component.

In various embodiments, the machining process is applied to an interior surface of the build tube.

In various embodiments, the method further includes exposing an interior layer of the manufactured component that is composed of the aerospace grade material.

In various embodiments, the build tube is removed by the machining process applied to an interior of the manufactured component.

In various embodiments, the method further includes configuring the build tube as a sacrificial component to manufacture the manufactured component.

In various embodiments, the additive manufacturing process is applied by the print-head configured to deposit the aerospace grade material on the surface of the build tube to form the manufactured component.

In various embodiments, a system is provided. The system includes at least one controller; and a memory operatively coupled to the at least one controller, the memory comprising instructions stored thereon that, when executed by the at least one controller, cause the at least one controller to: apply an additive process to a build tube around a longitudinal axis of the build tube by rotating the build tube around the longitudinal axis; translate a print-head in a parallel configuration to the longitudinal axis to enable a deposit by a print-head of aerospace grade material on a surface of the build tube to form a manufactured component, wherein the build tube comprises a sacrificial component, and wherein in response to completion of the additive process, another controller of a device is configured to apply instructions for a machine process using the device about the longitudinal axis of the manufactured component to remove the sacrificial component that comprises an interior surface of the manufactured component which exposes an interior surface of the manufactured component composed of an aerospace grade material.

In various embodiments, the instructions, when executed by the another controller of the device, further cause the another controller to: apply the machine process to remove the sacrificial component from an interior of the manufactured component.

In various embodiments, the interior of the manufactured component which is exposed comprises the aerospace grade material.

In various embodiments, the sacrificial component is composed of a first type of material and wherein the manufactured component is composed of a second type of material that is different from the first type of material.

In various embodiments, the instructions, when executed by both controllers, further cause both controllers to use the sacrificial component as the build tube to configure the manufactured component.

In various embodiments, the instructions, when executed by a controller, further cause the controller to apply the additive process using the print-head to deposit the aerospace grade material on the surface of the build tube to form the manufactured component.

In various embodiments, a non-transitory computer readable medium comprising a plurality of instructions which, when executed by a controller, cause the controller to rotate a sacrificial component around a longitudinal axis to enable a print-head to deposit aerospace grade material on a surface of the sacrificial component; deposit by the print-head the aerospace grade material on the surface of the sacrificial component; and in response to a completion of the deposit of the aerospace grade material on the surface of the sacrificial component, apply by another controller using a device, a machine process in the longitudinal axis of a manufactured component to remove the sacrificial component that comprises at least an interior surface of the manufactured component to expose the interior surface of the manufactured component that comprises the aerospace grade material.

In various embodiments, the instructions, when executed by the another controller, causes the another controller to remove the sacrificial component by a machine process that is applied to an interior of the manufactured component.

In various embodiments, the instructions, when executed by the another controller, causes the another controller to apply the machine process to an interior layer that comprises the sacrificial component.

In various embodiments, the instructions, when executed by the another controller, causes the controller to expose the interior layer of the manufactured component that is composed mostly of the aerospace grade material.

In various embodiments, the sacrificial component is composed of a material that is different than the aerospace grade material that makes up the manufactured component.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Figure 1A:
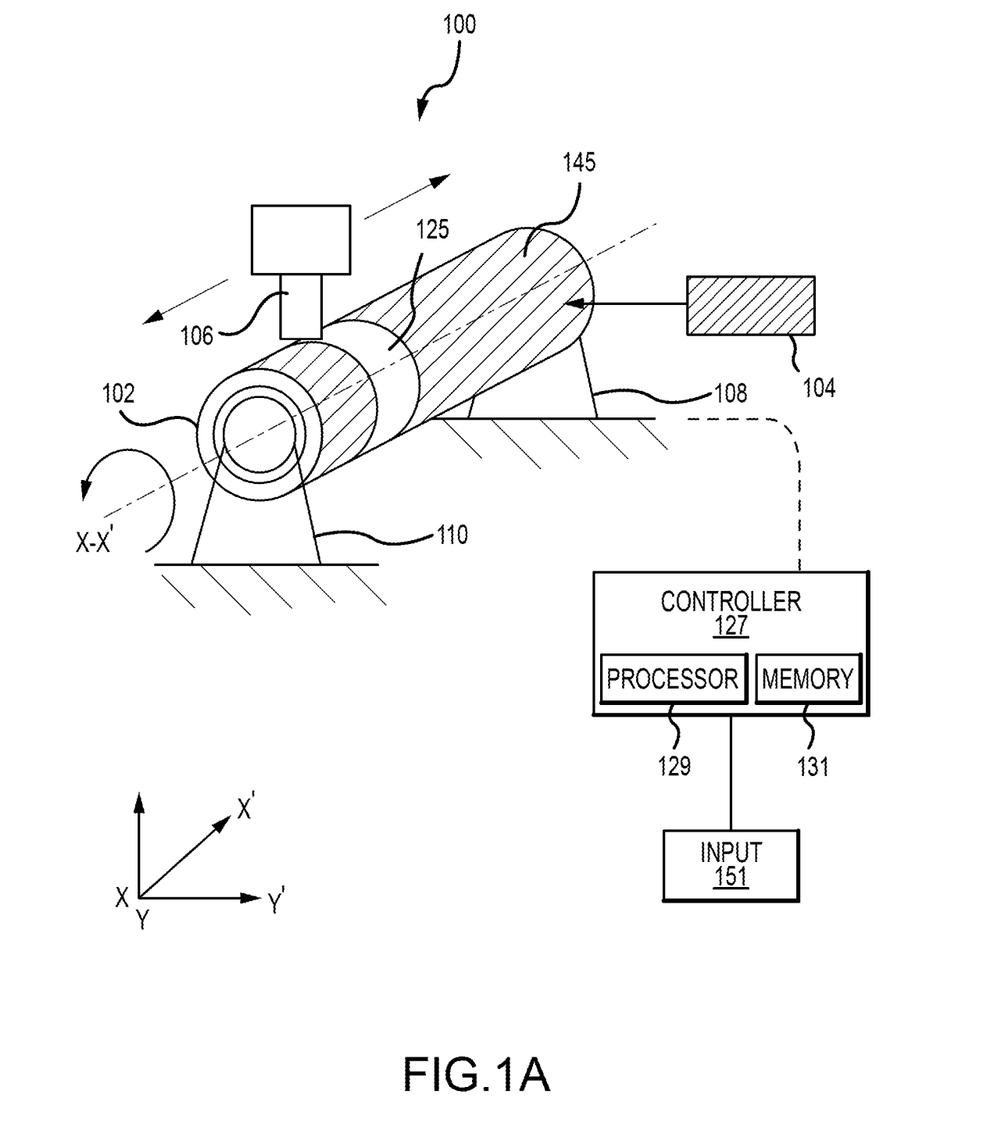
FIG. 1A is a diagram of an oblique view of a build tube configured as a sacrificial cylinder in an additive manufacturing system in accordance with various embodiments.

With reference to FIGS. 1A and 1n accordance with various embodiments, an additive manufacturing system 100 is illustrated. The additive manufacturing system 100 can comprise a build tube 102 (also referred to or configured as a sacrificial cylinder). The build tube 102 can be coupled to a first mandrel fixture 108 and a second mandrel fixture 110. In various embodiments, the build tube 102 can comprise ductile iron tubes such as those in conformance with ASTM A536, grey iron tubes such as those in conformance with ASTM A48, carbon steel welded tubes pipes such as those in conformance with ASTM A53 and carbon steel welded seamless pipe such as those in conformance with ASTM A106. In various embodiments, an aerospace-grade material 104 comprises aluminum alloys, high-strength steels, titanium alloys, and composites which are widely used in commercial aerospace structures (accounting for most of the weight of airframes). The aerospace-grade material 104 can be deposited onto the build tube's outer circumferential surface as the build tube 102 is rotated on the mandrel fixtures 108 and 110 and a print-head 106 of an additive manufacturing machine moves across the build tube's longitudinal axis X-X'. The first mandrel fixture 108 and the second mandrel fixture 110 are configured such that a longitudinal axis X-X' goes through the center of each mandrel fixture and through the center of the build tube 102. In various embodiments, the mandrel fixture 110 will be connected via a cylindrical mandrel, and the mandrel will have features to fix the rotating mandrel to the build tube's inside diameter and/or ends so that angular orientation of the build tube relative to the print-head can be controlled. In various embodiments, the mandrel fixture 110 will comprise a single motor 122 (in FIG. 1B).

Figure 1B:
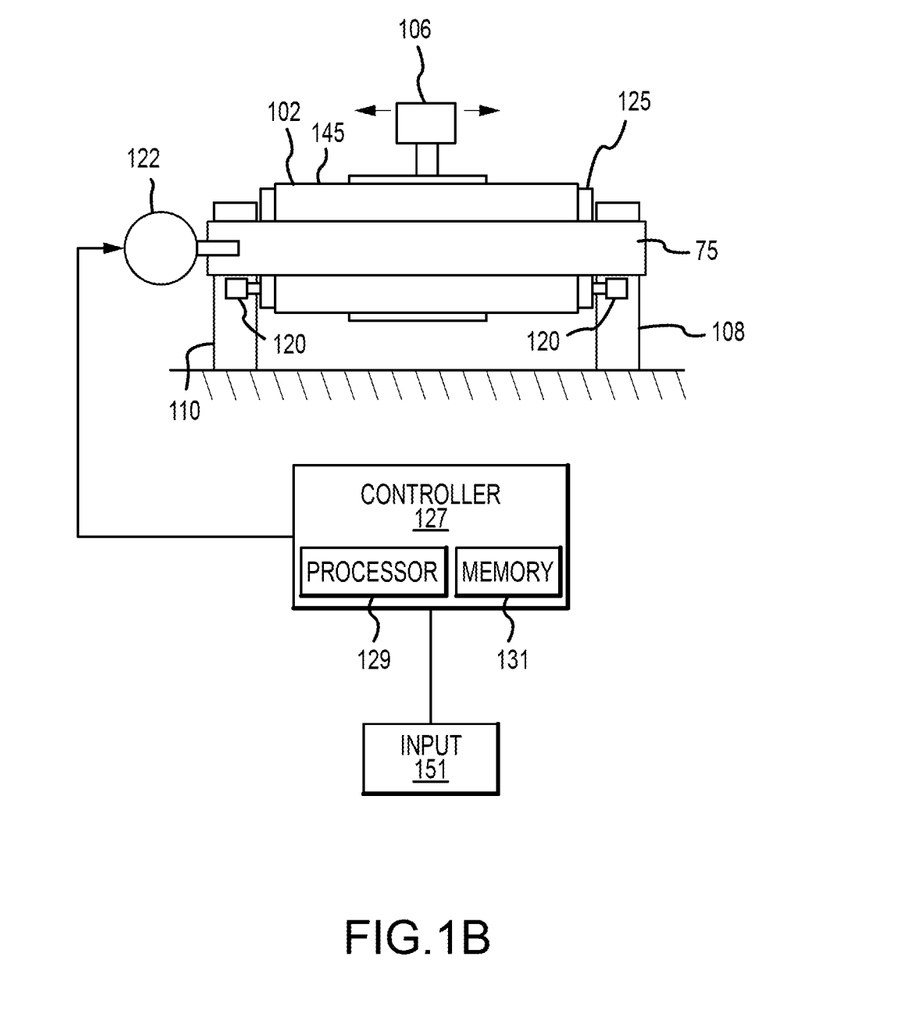
FIG. 1B is a diagram of a lateral view of a build tube configured as a sacrificial cylinder with lateral support and a single motor configured on one end in an additive manufacturing system in accordance with various embodiments

In various embodiments, the single motor 122 can be configured to be controlled by the controller 127 to axially rotate the build tube 102 around the longitudinal axis X-X'. In implementation, the print-head 106 can be controlled by the controller 127 to deposit aerospace grade material 104 on a surface of the build tube 102 during an additive manufacturing process. In various embodiments, the print-head 106 will be controlled by the controller 127 to deposit the aerospace-grade material 104 while the build tube 102 is rotated around the longitudinal axis X-X'. In implementation, the print-head 106 can also be configured to laterally traverse the build tube 102 by the controller 127 from the first mandrel fixture 108 to the second mandrel fixture 110 along the longitudinal axis X-X'.

Figure 2:
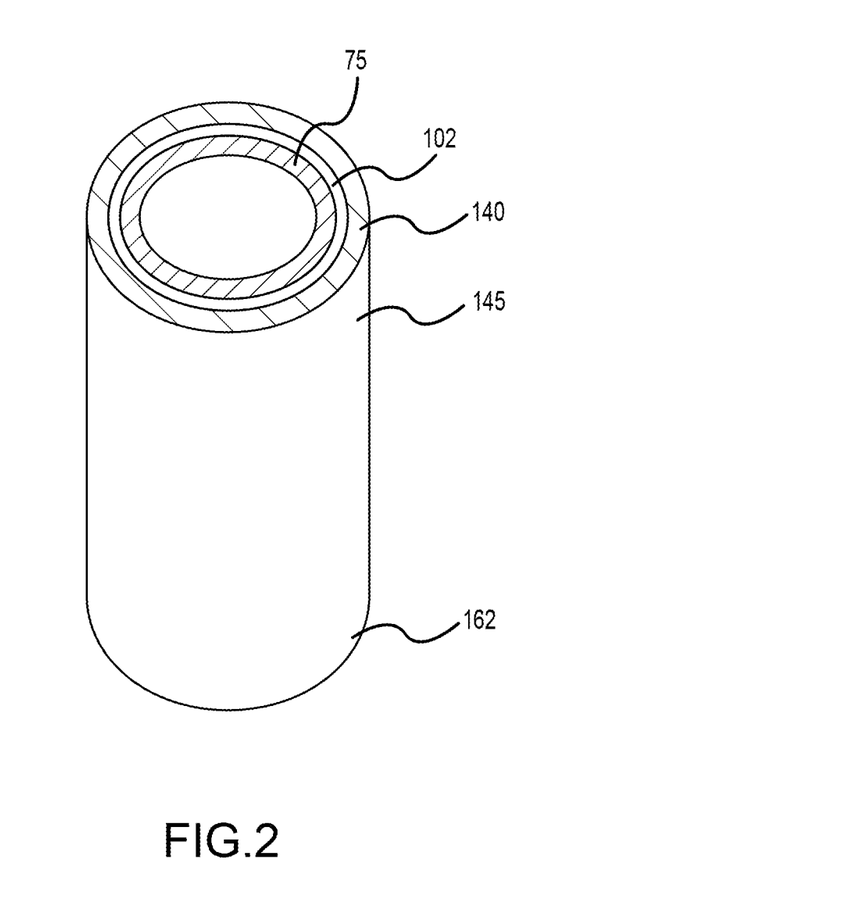
FIG. 2 is a diagram of a perspective of a sacrificial cylinder integrated with the manufactured cylinder in accordance with various embodiments.

The additive manufacturing process mentioned above uses the additive manufacturing system 100 to deposit, by control of the print-head 106 by the controller 127, aerospace-grade material 104 onto the surface 145 of the build tube 102 to form a manufactured cylinder 140 (of FIG. 2). The additive manufacturing process can be performed using a number of known additive manufacturing processes (e.g., Directed Energy Deposition (DED) processes etc.). In various embodiments, the additive manufacturing process implemented can comprise wire arc additive manufacturing (WAAM). After the additive manufacturing process is complete, the build tube 102 can be machined away using a device so that only the manufactured cylinder 140 composed of aerospace-grade material remains. In various embodiments, the manufactured cylinder 140 is composed mostly of the aerospace-grade material.

In various embodiments, the controller 127 can control the mandrel attached to the first mandrel fixture 108 and the second mandrel fixture 110 to rotate the build tube 102 about the X-X' axis.

In various embodiments, the additive manufacturing (AM) print head 106 has freedom of movement laterally across the length of the rotating sacrificial build tube 102. The notional AM deposited aerospace-grade material 104 in on the build tube 102. As the material is deposited, the build tube 102 is slowly rotated via the notional motor (single motor 122 of FIG. 1B) controlled by the controller 127.

In various embodiments, the build tube 102 can be configured with a collet 125 (in FIG. 1B) for traversal support of the build tube 102 to compensate for perpendicular forces during the additive manufacturing process. The collet 125 fixes the build tube 102 to the mandrel 75 to enable rotation of the build tube 102 without slippage between the mandrel 75 and the build tube 102. The collet 125 also enable lateral support of the build tube 102 to fix the build tube 102 relative to the mandrel 75 to minimize or prevent any lateral movement along the X-X' axis.

In various embodiments, the controller 127 may configure one or more layers composed primarily of the aerospace-grade material to form a single deposition layer or multiple deposition layers. Each deposition layer may have the same thickness as one another or a different thickness. In various embodiments, a coating layer can also be deposited by the print-head 106 over the one or more layers. After depositing a coating or other surface layer material, other finishing techniques may be employed that include machining of a coating or other surface layer material to a desired thickness. The coating may be ground, sanded, or otherwise machined to smooth, polish, and/or decrease the radial thickness of the coating.

System 100 further includes the controller 127 in communication with elements of the additive manufacturing system 100. The controller 127 may include one or more processors 129 configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

The controller 127 may further include a memory 131 to store data, executable instructions, system program instructions, and/or controller instructions to implement the control logic of controller 127. Memory 131 may further store a database, a look up table, and/or other data objects for use by the executable instructions for implementing the control logic of controller 127. System program instructions and/or controller instructions may be loaded onto a non-transitory, tangible computer-readable medium having instructions stored thereon that, in response to execution by a controller 127, cause the controller 127 to perform various operations. The term "non-transitory" is to be understood to remove only propagating transitory signals per se from the claim scope and does not relinquish rights to all standard computer-readable media that are not only propagating transitory signals per se.

Controller 127 may further include an input 151. In various embodiments, input 151 may be a bus or communication protocol with another device. In various embodiments, input 151 may be a touch screen, keyboard, and/or other input device. In various embodiments, input 151 may be a network connection for receiving inputs via a network connected device.

Controller 127 may send instructions to additive manufacturing system 100 to control the working parameters of the system 100. In various embodiments, the instructions may be stored in memory 131 as a computer numerical control (CNC) program. Various examples of working parameters (applicable to a friction stir additive process) include the revolutions per minute (RPM), the axial speed, the axial force, and the radial speed applied to the build tube 102. Other working parameters comprise directed energy in watts at a feedstock wire, wire feed rate, wire size and related attributes configured in processes of the additive manufacturing system 100. In various embodiments, the working parameters may be received via input 151. In various embodiments, the working parameters may be derived from input received via input 151. For example, input 151 may receive a type of metal of built, and/or a diameter of build tube 102, among other input information.

In various embodiments, controller 127 may use the input information to determine the working parameters to send to additive manufacturing system 100. In various embodiments, controller 127, and more specifically memory 131, may store a database of working parameters for different material types and diameters. For example, controller 127 may send a first set of working parameters to additive manufacturing system 100 in response to the input 151 indicating with the build tube 102 to form a layer or multiple layers on the surface of the build tube 102. Then, the another controller 320 (shown in FIG. 3) may send a second set of working parameters to perform a next phase of removal (the machine process) of the sacrificial cylinder (i.e., the build tube 102) from the interior of the manufactured cylinder.

By adjusting the working parameters (e.g., rotational speed, axial speed, axial force, radial speed, etc.) for different materials and sized materials, controller 127 may deposit coatings having different thicknesses which serves to produce different types of manufactured cylinders while reducing the cost of production. For example, the controller 127 can be instructed to configure a manufactured cylinder comprising a layer of a certain type of metal alloy with a coating or without a coating. Additionally, each layer may be controlled to be a precise thickness to avoid material waste associated and machining the layer to a thinner, desired, thickness if desired (i.e., additional machining (e.g., grinding, sanding, etc.) need not be performed to reduce the layer to the desired thickness).

In various exemplary embodiments, the build tube 102 may be configured from a low-cost industrial grade grey iron, ductile iron tube, or steel pipe used as a sacrificial cylindrical build tube to form a manufactured cylinder using an additive manufacturing.

Referring to FIG. 1B, a lateral view of a build tube configured as a sacrificial cylinder with lateral support and a single motor configured on one end in an additive manufacturing system is illustrated in accordance with various embodiments. In FIG. 1B, there is shown notional motor (i.e., the single motor) 122 configured on one end of the build tube 102, AM notional print head 106, and a notional collet 125 that is configured by a pair of loaded plates that clamps ends of the build tube 102 to ensure that it rotates with the mandrel 75. The plates are pinned or splined so as to rotate with the mandrel 75. The mandrel 75 is either solid or hollow. There are also configured to the mandrel 75 on either end, a notional clamping actuator mechanism 120. Also shown in FIG. 1B is notional additively deposited aerospace grade material 104 (in FIG. 1A) on the build tube 102. The notional motor (single motor 122) is controlled by the controller 127 with memory 131, processor 129 coupled to the input 151.

FIG. 2 is a diagram of a perspective of a sacrificial cylinder integrated with the manufactured cylinder in accordance with various embodiments. In various embodiments, the build tube 102 is configured as a sacrificial cylinder that is a rigid structure designed to be disintegrated and/or removed after the composite fabrication is completed. The build tube 102 can be configured with a core material that has no interaction with the manufactured cylinder (i.e., does not chemically interact with the deposited alloy or composite material that make up the manufactured cylinder).

In various embodiments, the manufactured cylinder 140 is a one-piece (i.e., monolithic) unit structure that is seamless, without any coupling joints in the structure that can have a higher likelihood to suffer stress or fatigue cracks from load impacts when the manufactured cylinder 140 is configured in an aircraft landing gear or other component that experiences loads or impacts. In various embodiments, the manufactured cylinder 140 is configured in a shape and size that is aligned with the build tube 102. For example, the build tube 102 may have a constant radius along the longitudinal axis (X-X') or the radius can vary. In various embodiments, the surface 145 (outer or exterior of the manufactured cylinder 140) may be configured with an additional coating layer 162 (i.e., protective coating) via the additive manufacturing process and may also be polished or finished with properties that prevent corrosion or other adverse weather conditions.

In various embodiments, the manufactured cylinder 140 include during the additive manufacturing process the build tube 102 and the mandrel 75 that is configured to support the build tube 102 to position the build tube 102 in a manner for the additive manufacturing process to build the manufactured cylinder 140. In various embodiments, the manufactured cylinder 140 comprises a first type of aerospace-grade material or a hybrid of multiple types of aerospace-grade material. In various embodiments, the build tube 102 comprises another or different type of material that includes rigid or semi-rigid properties. For example, the build tube 102 can comprise ductile iron tubes formed of ASTM A536 (e.g., up to a 9 inch (22.86 centimeters) pipe outside diameter), grey iron tubes such as ASTM A48 (e.g., up to a 9 inch (22.86 centimeters) pipe outside diameter), carbon steel welded pipes such as ASTM A53 (e.g., up to a 24 inch (60.96 centimeters) pipe outside diameter) and carbon steel welded seamless pipes such as ASTM A106 (e.g., up to a 24 inch (60.96 centimeters) pipe outside diameter). In various embodiments, the tubes and pipes described above can be configured with diameters that exceed the dimensions described in accordance with design requirements.

Figure 3:
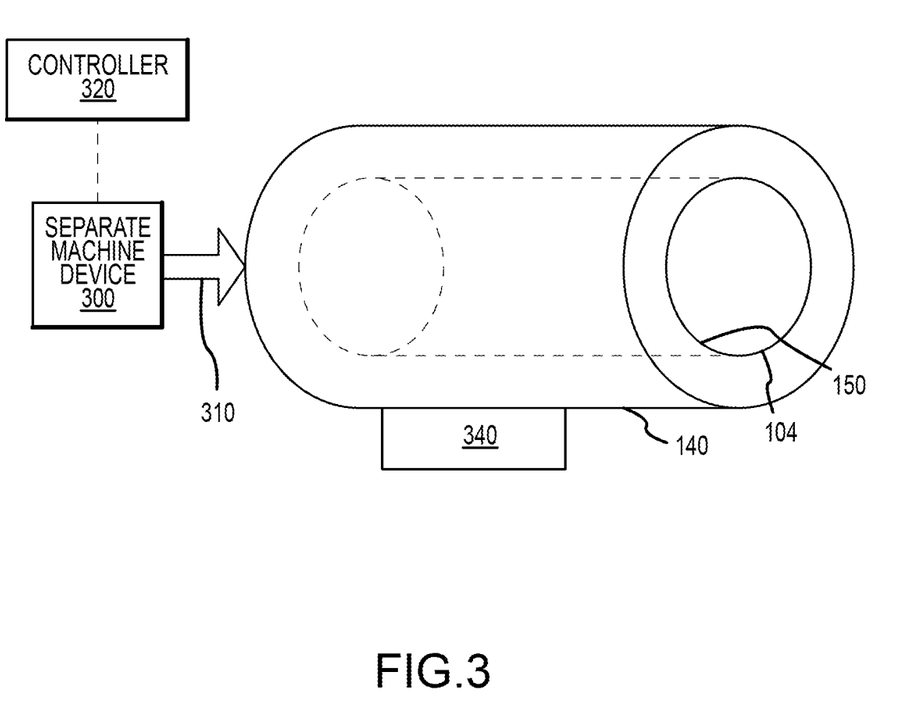
FIG. 3 is a diagram of a manufactured cylinder that remains with the sacrificial cylinder or build tube machined away using a machine in accordance with various embodiments.

Referring to FIG. 3, FIG. 3 is a diagram of an exemplary manufactured cylinder 140 that remains with the sacrificial cylinder or build tube machined away in accordance with various embodiments. In FIG. 3, there is shown the manufactured cylinder 140 that is configured or made up of deposited aerospace grade material 104. The inner surface 150 of the manufactured cylinder 140 is configured at a location that enables machining away most if not all of the sacrificial cylinder (i.e., build tube 102). In various embodiments, the sacrificial cylinder may not be entirely machined or removed as desired with respect to the inner surface 150 of the manufactured cylinder 140 wherein in response to completion of the additive process, a machine (e.g., lathe, boring bar) is configured to apply a machining process in the longitudinal axis of the manufactured cylinder to remove the sacrificial cylinder that comprises an interior surface of the manufactured cylinder exposing an interior surface of the manufactured cylinder composed of the aerospace grade material.

In various embodiments, by moving the mandrel fixture 340 laterally relative to a machining device 300, rather than keeping mandrel fixture 340 fixed and moving the machining device 300 laterally, the outside diameter of the cylinder may be trepanned (i.e., burring hole by a drilling operation for removing the sacrificial cylinder in the interior).

Figure 4:
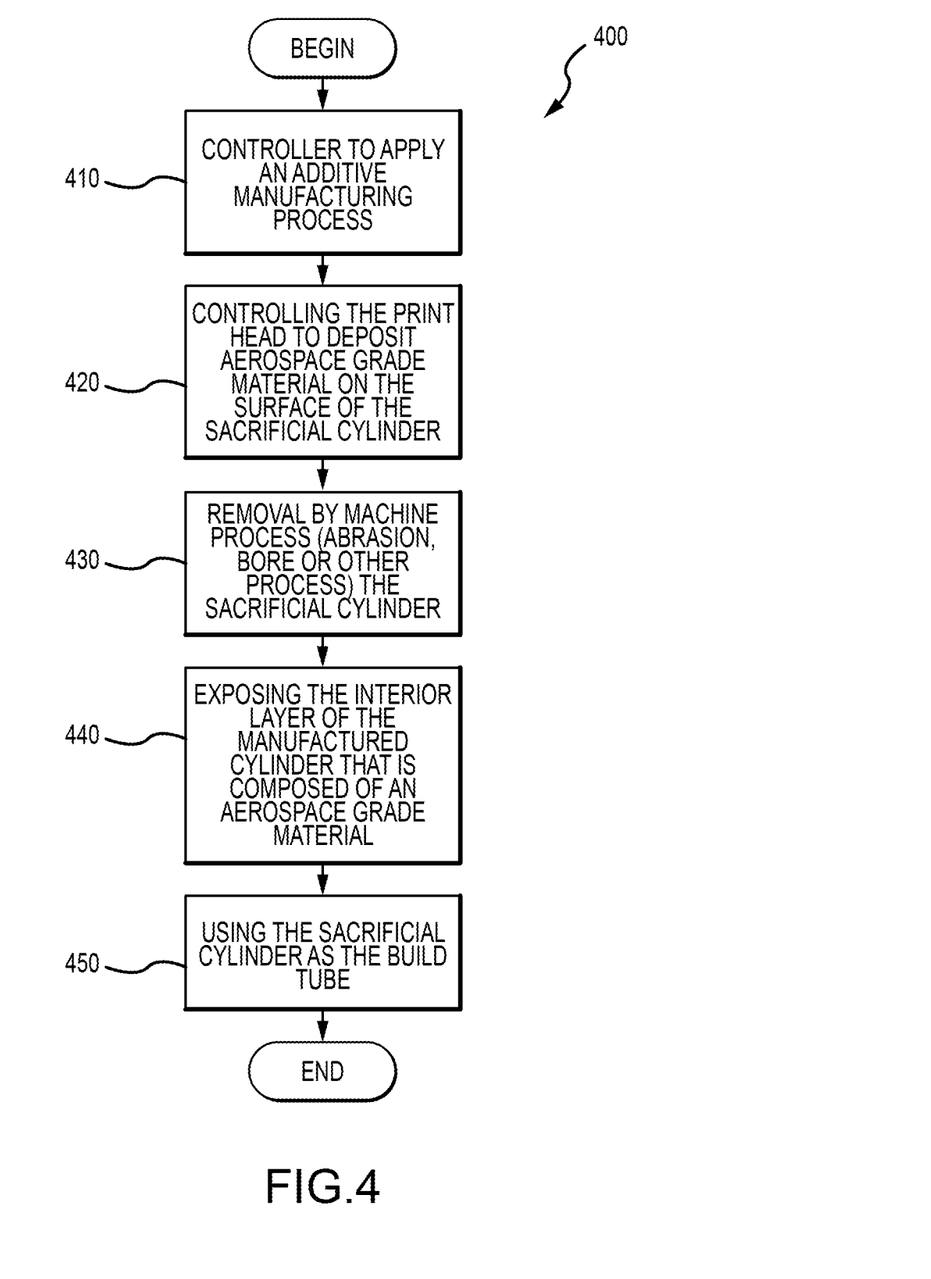
FIG. 4 is a flowchart illustrating a method for fabricating the manufactured cylinder using the build tube or sacrificial cylinder in accordance with various embodiments.

FIG. 4 is a flowchart of an additive manufacturing process that uses the additive manufacturing system 100 to deposit aerospace-grade material 104 onto the surface of build tube 102 to form a manufactured cylinder in accordance with various embodiments. In various embodiments, additive manufacturing methods can produce a large cylindrical part for various aerospace needs such as cylinders for landing gear. The large sacrificial cylindrical part can be formed through depositing an aerospace-grade material around a build tube. The aerospace-grade material can be deposited onto the build tube's 102 circumference and outer surfaces as the build tube 102 is rotated on a mandrel and a print-head of an additive manufacturing machine moves across the build tube's longitudinal axis. After printing is completed, the entire build tube 102 can be machined away using various conventional machining methods.

In FIG. 4, in the flowchart 400, at step 410, a controller 127 is configure to apply an additive manufacturing process to a build tube 102 formed around a longitudinal axial direction of the build tube 102 by rotating the build tube 102 around a longitudinal axis for enabling a print-head to deposit aerospace grade material on a surface of the build tube 102 to form a manufactured cylinder 140 by deposits of the aerospace grade material on the surface of the build tube 102 wherein the build tube 102 comprises a sacrificial cylinder. At step 420, the additive process is applied by a print-head 106 configured to deposit aerospace-grade material on the surface of the build tube 102 to form the manufactured cylinder 140.

In various embodiments, at step 430, the controller 127, in response to completion of the additive manufacturing process, applies a machining process in the longitudinal axial direction to remove the sacrificial cylinder that comprises an interior surface of the manufactured cylinder 140 exposing an interior surface of the manufactured cylinder 140 composed of the aerospace grade material.

In various embodiments, at step 430, the sacrificial cylinder is removed by a machine process applied to an interior of the manufactured cylinder 140 wherein the machine process is applied by another controller using a device to an interior layer of the build tube 102 that comprises the sacrificial cylinder.

In various embodiments, at step 440, the interior layer of the manufactured cylinder 140 is exposed and comprises the aerospace grade material. In various embodiments, at step 450, the sacrificial cylinder is used as the build tube 102 to configure the manufactured cylinder 140.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a, b, and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    applying an additive manufacturing process to a build tube around a longitudinal axial direction of the build tube by rotating the build tube around a longitudinal axis;
    translating, by the additive manufacturing process, a print-head in a parallel configuration to the longitudinal axis to enable the print-head to deposit an aerospace grade material on a surface of the build tube to form a manufactured component; and
    after completion of the additive manufacturing process, applying, by a device, a machining process in the longitudinal axis of the manufactured component to incompletely remove the build tube, wherein the machining process comprises machining the build tube in an interior of the manufactured component to expose most but not all of the interior surface of the manufactured component.

2. The method of claim 1, wherein the manufactured component comprises a manufactured cylinder.

3. The method of claim 1, wherein the build tube is used as a sacrificial component and removed by the machining process applied to the build tube.

4. The method of claim 1, wherein the machining process exposes an interior layer of the manufactured component that is composed of the aerospace grade material.

5. The method of claim 1, further comprising:
    configuring the build tube as a sacrificial component to manufacture the manufactured component.

6. The method of claim 5, wherein the additive manufacturing process is applied by the print-head configured to deposit the aerospace grade material on the surface of the build tube to form the manufactured component.

7. A non-transitory computer readable medium comprising a plurality of instructions which, when executed by a controller, cause the controller to:
    rotate a sacrificial component around a longitudinal axis to enable a print-head to deposit aerospace grade material on a surface of the sacrificial component;
    deposit, by the print-head, the aerospace grade material on the surface of the sacrificial component;
    deposit, by the print-head, a protective coating on the surface of the aerospace grade material; and
    in response to a completion of the deposit of the aerospace grade material on the surface of the sacrificial component and the deposit of the protective coating on the surface of the aerospace grade material, apply, by another controller using a device, a machine process in the longitudinal axis of a manufactured component to incompletely remove the sacrificial component and expose most but not all of the interior surface of the manufactured component that comprises the aerospace grade material.

8. The non-transitory computer readable medium according to claim 7, wherein the instructions, when executed by the another controller, cause the another controller to remove the sacrificial component by a machine process that is applied to an interior of the sacrificial component.

9. The non-transitory computer readable medium according to claim 8, wherein the instructions, when executed by the another controller, causes the another controller to apply the machine process to an interior layer that comprises the sacrificial component.

10. The non-transitory computer readable medium according to claim 9, wherein the instructions, when executed by the another controller, cause the controller to expose the interior surface of the manufactured component that is composed mostly of the aerospace grade material.

11. The non-transitory computer readable medium according to claim 10, wherein the sacrificial component is composed of a material that is different than the aerospace grade material that makes up the manufactured component.

12. The method of claim 1, further comprising:
  translating, by the additive manufacturing process, the print-head in the parallel configuration to the longitudinal axis to enable the print-head to deposit a protective coating layer on a surface of the aerospace grade material.

\* \* \* \* \*